US010199723B2

(12) United States Patent
Wienke et al.

(10) Patent No.: US 10,199,723 B2
(45) **Date of Patent: *Feb. 5, 2019**

(54) INFLATABLE RADOME

(75) Inventors: Dietrich Wienke, Echt (NL); Eelco Van Oosterbosch, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 1020 days.

This patent is subject to a terminal disclaimer.

(21) Appl. No.: 14/004,300

(22) PCT Filed: Mar. 19, 2012

(86) PCT No.: PCT/EP2012/054809

§ 371 (c)(1),
(2), (4) Date: Nov. 19, 2013

(87) PCT Pub. No.: WO2012/126885

PCT Pub. Date: Sep. 27, 2012

(65) Prior Publication Data

US 2014/0062829 A1 Mar. 6, 2014

(30) Foreign Application Priority Data

Mar. 22, 2011 (EP) .................................... 11159242

(51) Int. Cl.

| | |
|---|---|
| ***H01Q 1/42*** | (2006.01) |
| ***B29C 70/22*** | (2006.01) |
| ***D06M 15/227*** | (2006.01) |
| ***D06N 3/04*** | (2006.01) |
| *D06N 3/00* | (2006.01) |
| *D06M 101/20* | (2006.01) |

(52) U.S. Cl.

CPC ............. *H01Q 1/427* (2013.01); *B29C 70/22* (2013.01); *D06M 15/227* (2013.01); *D06N 3/045* (2013.01); *H01Q 1/42* (2013.01); *D06M 2101/20* (2013.01); *D06N 3/0038* (2013.01)

(58) Field of Classification Search

CPC ............ D06M 2101/20; D06M 15/227; D06N 3/0038; D06N 2201/0254; D06N 3/045; D06N 2203/042; D10B 2321/02; D10B 2321/021; D10B 2321/0211; D10B 2321/022; D04H 3/005; D04H 3/007; D01F 6/30; B32B 2262/0253; B32B 2323/04; B32B 2323/043; B32B 2323/046; B32B 27/32; B32B 27/327; C08F 210/00; C08F 210/02; C08F 210/04; C08F 210/06; C08F 210/08; C08F 210/10; C08F 210/14; C08L 23/04; C08L 23/08; C08L 23/0807; C08L 23/0815; C08L 23/10; C08L 23/12; C08L 23/14; C08L 23/142; C08J 5/2231; C08J 2323/04; C08J 2323/06; C08J 2323/08; C08J 2323/10; C08J 2323/12; C08J 2323/14

USPC ........... 442/170–171, 41, 290, 398; 343/784, 343/789, 872, 873

See application file for complete search history.

(56) References Cited

U.S. PATENT DOCUMENTS 5,028,928 A 7/1991 Vidmar et al.
5,994,242 A * 11/1999 Arthurs .................. B32B 27/12 442/102
6,132,657 A 10/2000 Cohen et al.
6,503,595 B1 * 1/2003 Kim ....................... C08L 23/10 427/374.4
2005/0093200 A1 * 5/2005 Tam .................... B29C 47/8805 264/211.14
2007/0135563 A1 * 6/2007 Simmons ................. B32B 7/12 524/570
2008/0187734 A1 8/2008 Morin
2009/0155511 A1 6/2009 Marissen
2010/0295749 A1 * 11/2010 Vanliere .................. H01Q 1/42 343/872
2012/0164902 A1 * 6/2012 Wienke ................. B29C 43/006 442/181

FOREIGN PATENT DOCUMENTS

EP 1 852 938 11/2007
WO WO 00/00334 1/2000
WO WO 2005/065910 7/2005
WO WO 2010122099 A1 * 10/2010 ........... B29C 43/006

* cited by examiner

*Primary Examiner* — Jeremy R Pierce

(74) *Attorney, Agent, or Firm* — Nixon & Vanderhye P.C.

(57) ABSTRACT

The invention relates to an inflatable radome containing a flexible radome wall, said radome wall comprising high strength polymeric fibers and further containing a plastomer wherein said plastomer is a semi-crystalline copolymer of ethylene or propylene and one or more C2 to C12 a-olefin co-monomers and wherein said plastomer having a density as measured according to IS01183 of between 860 and 930 kg/m$^3$.

14 Claims, No Drawings

INFLATABLE RADOME

This application is the U.S. national phase of International Application No. PCT/EP2012/054809 filed 19 Mar. 2012 which designated the U.S. and claims priority to EP 11159242.4 filed 22 Mar. 2011, the entire contents of each of which are hereby incorporated by reference.

The present invention relates to an inflatable radome containing a flexible radome wall, said radome wall comprising high strength polymeric fibers. The present invention also relates to a system comprising an antenna, preferably a portable antenna, and an inflatable radome containing a flexible radome wall, said radome wall comprising high strength polymeric fibers.

BACKGROUND OF THE INVENTION

Radomes are highly electromagnetically transparent structures used for covering and protecting antennas. Antennas used in e.g. radar installations, wireless telecom infrastructure and radio telescopes often need a radome or a covering structure of some kind to protect them from weather, e.g. sunlight, wind and moisture. The presence of the radome is particularly mandatory for antennas placed in regions where high winds or storms often occur, in order to protect the antennas from hale and impacts from projectiles such as debris carried by the wind.

A special kind of radomes is an inflatable radome, which is particularly used to protect portable antennas. An inflatable radome most often can be easily packed, shipped and quickly deployed and is typically manufactured from a flexible membrane. It is preferred that the flexible membrane is designed to resist times and again to stresses induced by repetitive inflation-deflation cycles, and to have a good tearing and/or abrasion resistance. At the same time said membrane needs to have good electromagnetic properties in order to least interfere with passing electromagnetic waves.

An inflatable radome is known for example from US 2004/0222938, said radome being used to protect and stabilize the orientation of an inflatable antenna. Further disclosures of inflatable radomes are given in U.S. Pat. No. 3,005,987 and U.S. Pat. No. 3,075,191. It was however observed that the known radomes when inflated may have difficulties in preserving their shape during utilization and in particular during long-term utilization. Exposure to sunlight, temperature variations, humidity, wind and other environmental factors acting on inflatable radomes may lead to alterations of the originally intended radome's shape. It was also observed that when the shape of the radome is altered during use, the efficiency of the antenna/radome system may decrease.

Therefore an aim of the present invention may be to provide an inflatable radome which preserves its shape during use and in particular during long-term use. A further aim of the invention may be to provide an inflatable radome which resists to alterations of its shape while at the same time is lightweight, strong and has good electromagnetic properties. Another aim of the invention may be to provide an inflatable radome that is less prone to being damaged and therefore to deflate and/or collapse. Yet another aim of the invention is to provide an inflatable radome having a reduced loss over wide frequency bandwidths, e.g. from 1 GHz to at least 100 GHz.

SUMMARY OF THE INVENTION

The invention provides an inflatable radome containing a flexible radome wall, said radome wall comprising high strength polymeric fibers, said wall further containing a plastomer wherein said plastomer is a semi-crystalline copolymer of ethylene or propylene and one or more C2 to C12 α-olefin co-monomers and wherein said plastomer having a density as measured according to ISO1183 of between 860 and 930 kg/m$^3$.

It was observed that the inflatable radome of the invention has a good resistance against shape alterations when inflated. It was also observed that the radome of the invention may effectively dissipate and minimize the influence of external loads generated by environmental factors such as winds, impacting debris and the like, acting thereupon. More in particular it was observed that the inflatable radome of the invention may have a good durability and prolonged lifetime being less prone to damages. Moreover, it was observed that the inflatable radome of the invention may have a reduced loss over wide frequency bandwidths, e.g. from 1 GHz to at least 100 GHz

DETAILED DESCRIPTION OF THE INVENTION

By a flexible radome wall is herein understood a radome wall which may be folded or bended. A measure of the flexibility of said wall may be when a sample of said wall having a supported end, i.e. the end thereof which is placed on a rigid support such as a table; a free end, i.e. the unsupported end; and a length of 500 mm between the rigid support and the free end, will deflect under its own weight with an angle of preferably more than 3°, more preferably more than 10°, even more preferably of more than 30°, with respect to the horizontal.

According to the invention, the flexible radome wall contains high strength polymeric fibers. By fiber is herein understood an elongated body having a length dimension and transverse dimensions, e.g. a width and a thickness, wherein the length dimension is much greater that the transverse dimensions. The term fiber also includes various embodiments e.g. a filament, a ribbon, a strip, a band, a tape and the like having regular or irregular cross-sections. Preferably, the fiber has a continuous length unlike staple fibers which have discontinuous lengths. A yarn for the purpose of the invention is an elongated body containing a plurality of fibers.

Suitable polymeric fibers or yarns that may be used in accordance with the invention include, but are not limited to, yarns or fibers manufactured from polymeric materials such as polyamides and polyaramides, e.g. poly(p-phenylene terephthalamide) (known as Kevlar®); poly(tetrafluoroethylene) (PTFE); poly{2,6-diimidazo-[4,5b-4',5'e]pyridinylene-1,4(2,5-dihydroxy)phenylene} (known as M5); poly (p-phenylene-2,6-benzobisoxazole) (PBO) (known as Zylon®); poly(hexamethyleneadipamide) (known as nylon 6,6), poly(4-aminobutyric acid) (known as nylon 6); polyesters, e.g. poly(ethylene terephthalate), poly(butylene terephthalate), and poly(1,4 cyclohexylidene dimethylene terephthalate); polyvinyl alcohols; thermotropic liquid crystal polymers (LCP) as known from e.g. U.S. Pat. No. 4,384,016; but also polyolefins other than polyethylene e.g. homopolymers and copolymers of polypropylene. Also yarns containing combinations of fibers manufactured from the above referred polymers can be used In a preferred embodiment, the polymeric fibers are polyolefin fibers, more preferably polyethylene fibers. Good results may be obtained when the polyethylene fibers are high molecular weight polyethylene (HMWPE) fibers, more preferably ultrahigh molecular weight polyethylene (UHM- WPE) fibers. Polyethylene fibers may be manufactured by any technique known in the art, preferably by a melt or a gel spinning process. If a melt spinning process is used, the polyethylene starting material used for manufacturing thereof preferably has a weight-average molecular weight between 20,000 g/mol and 600,000 g/mol, more preferably between 60,000 g/mol and 200,000 g/mol. An example of a melt spinning process is disclosed in EP 1,350,868 incorporated herein by reference. Most preferred polymeric fibers are gel spun UHMWPE fibers, e.g. those sold by DSM Dyneema under the name Dyneema®. When the gel spinning process is used to manufacture said fibers, preferably an UHMWPE is used with an intrinsic viscosity (IV) of preferably at least 3 dl/g, more preferably at least 4 dl/g, most preferably at least 5 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Preferably the UHMWPE fibers are manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "Advanced Fibre Spinning Technology", Ed. T. Nakajima, Woodhead Publ. Ltd (1994), ISBN 185573 182 7.

In a special embodiment, the polymeric fibers used in accordance to the invention have a tape-like shape, or in other words said polymeric fibers are polymeric tapes. Preferably said polymeric tapes are UHMWPE tapes. A tape (or a flat tape) for the purposes of the present invention is a fiber with a cross sectional aspect ratio, i.e. ratio of width to thickness, of preferably at least 5:1, more preferably at least 20:1, even more preferably at least 100:1 and yet even more preferably at least 1000:1. The tape preferably has a width of between 1 mm and 600 mm, more preferable between 1.5 mm and 400 mm, even more preferably between 2 mm and 300 mm, yet even more preferably between 5 mm and 200 mm and most preferably between 10 mm and 180 mm. The tape preferably has a thickness of between 10 μm and 200 μm and more preferably between 15 μm and 100 μm. By cross sectional aspect ratio is herein understood the ratio of width to thickness.

Preferably, the polymeric fibers employed by the invention have deniers in the range of from 0.5 to 20, more preferably from 0.7 to 10, most preferably from 1 to 5 dpf. The yarns containing said fibers preferably have deniers in the range of from 100 to 3000, more preferably from 200 to 2500, most preferably from 400 to 1000 dtex.

By high strength fibers is understood herein fibers that have a high tensile strength of e.g. at least 0.5 GPa. The tensile strength of the polymeric fibers is preferably at least 1.2 GPa, more preferably at least 2.5 GPa, most preferably at least 3.5 GPa. Preferably, the polymeric fibers are polyethylene fibers, more preferably UHMWPE fibers having a tensile strength of preferably at least 1.2 GPa, more preferably at least 2.5 GPa, most preferably at least 3.5 GPa. A flexible radome wall containing strong polyethylene fibers has a better mechanical stability, is lighter in weight and stronger than any other flexible radome walls having a similar construction but which contains fibers manufactured from e.g. polyester, nylon or aramid.

Preferably the polymeric fibers have a tensile modulus of preferably at least 30 GPa, more preferably of at least 50 GPa, most preferably of at least 60 GPa. Preferably the polymeric fibers are polyethylene fibers, more preferably UHMWPE fibers, wherein tensile modulus of the polyethylene fibers and in particular of the UHMWPE fibers is at least 50 GPa, more preferably at least 60 GPa, most preferably at least 80 GPa. It was observed that when such high strength polyethylene and more in particular such high strength UHMWPE fibers are used in accordance with the invention, the inflatable radome of the invention may have good mechanical stability, good lifetime and may be able to successfully withstand rather large external loads acting thereupon.

In a preferred embodiment of the invention, at least 80 mass %, more preferably at least 90 mass %, most preferably about 100 mass % of the fibers contained by the flexible radome wall are high strength fibers. More preferably, at least 80 mass %, more preferably at least 90 mass %, most preferably 100 mass % of the fibers contained by the flexible radome wall are polyethylene fibers and more preferably UHMWPE fibers. The remaining mass % of fibers may consist of other polymeric fibers as enumerated hereinabove. It was observed that by using radome walls containing an increased mass % of polyethylene fibers and in particular radome walls wherein all polymeric fibers are polyethylene fibers, the inflatable radome of the invention may show a good resistance to sun light and UV degradation, high tear strength and low weight.

Preferably the high strength polymeric fibers contained by the flexible radome wall used in accordance to the invention are forming a fabric, i.e. said flexible radome wall contains a fabric comprising said fibers. Said fabric may be of any construction known in the art, e.g. woven, knitted, plaited, braided or non-woven or a combination thereof. Knitted fabrics may be weft knitted, e.g. single- or double-jersey fabric or warp knitted. An example of a non-woven fabric is a felt fabric or a fabric wherein the fibers run substantially along a common direction in a substantially parallel fashion. Further examples of woven, knitted or non-woven fabrics as well as the manufacturing methods thereof are described in "Handbook of Technical Textiles", ISBN 978-1-59124-651-0 at chapters 4, 5 and 6, the disclosure thereof being incorporated herein as reference. A description and examples of braided fabrics are described in the same Handbook at Chapter 11, more in particular in paragraph 11.4.1, the disclosure thereof being incorporated herein by reference.

Preferably the fabric used in accordance to the invention is a woven fabric. Preferably said woven fabric is constructed with a small weight per unit length and overall cross-sectional diameter. Preferred embodiments of woven fabrics include plain (tabby) weaves, rib weaves, matt weaves, twill weaves, basket weaves, crow feet weaves and satin weaves although more elaborate weaves such as triaxial weaves may also be used. More preferably the woven fabric is a plain weave, most preferably, the woven fabric is a basket weave. Preferably, the fibers used to manufacture the woven fabric are tapes, more preferably they are fibers having a rounded cross-section, said cross section having preferably an aspect ratio of at most 4:1, more preferably at most 2:1.

According to the invention, the flexible radome wall also contains a plastomer wherein the plastomer is a semi-crystalline copolymer of ethylene or propylene and one or more C2 to C12 α-olefin co-monomers and wherein said plastomer has a density as measured according to ISO1183 of between 860 and 930 kg/m$^3$.

Preferably, the flexible radome wall contains a fabric, wherein the plastomer is preferably impregnated throughout said fabric. The impregnation may be carried out in various forms and ways, for example by lamination or by forcing the plastomer through the yarns and/or the fibers of the fabric in e.g. a heated press. Examples of processes for the manufacturing of impregnated fabrics are disclosed for instance in U.S. Pat. No. 5,773,373; U.S. Pat. No. 6,864,195 and U.S. Pat. No. 6,054,178 included herein by reference. These processes can be routinely adapted for the materials, e.g. fibers, plastomer, utilized by the present invention.

Good results may be obtained when the plastomer has a tensile modulus of at most 0.6 GPa, more preferably of at most 0.4 GPa, most preferably of at most 0.2 GPa. Preferably, said plastomer has a tensile modulus of at least 0.01 GPa, more preferably of at least 0.05 GPa, most preferably of at least 0.1 GPa.

It was observed that when using such impregnated fabrics as the flexible radome wall of the inflatable radome of the invention, the mechanical stability of said radome was improved. In particular the elongation of the radome under external loads and/or its shrinkage in time were minimized.

A preferred example of a flexible radome wall suitable for the invention is a radome wall comprising a woven fabric containing high strength polyethylene fibers, more preferably high strength UHMWPE fibers and which is impregnated with a plastomer which is a semi-crystalline copolymer of ethylene or propylene and one or more C2 to C12 α-olefin co-monomers and wherein said plastomer has a density as measured according to ISO1183 of between 860 and 930 $kg/m^3$. When the inflatable radome of the invention comprises such a flexible radome wall, said radome may show enhanced tear resistance; good handling; and excellent chemical and fire resistance. In particular impregnated woven fabrics containing polyethylene fibers and/or yarns show an excellent weight to strength ratio, they are lightweight and stronger than any impregnated fabric containing e.g. polyester, nylon, or aramid fibers.

In a preferred embodiment of the invention, the flexible radome wall comprises:

(i) a fabric, preferably a woven fabric, comprising yarns containing polyethylene fibers, preferably UHMWPE fibers;

(ii) a plastomer layer adhered to at least one surface of said woven fabric wherein said plastomer is a semi-crystalline copolymer of ethylene or propylene and one or more C2 to C12 α-olefin co-monomers and wherein said plastomer has a density as measured according to IS01183 of between 860 and 930 $kg/m^3$.

It was noticed by the present inventors that when the inflatable radome of the invention comprises such a flexible radome wall, said radome may show in addition to the above mentioned advantages, a proper resistance to shrinkage especially during long term use. It was also observed the said radome is lightweight, has a good tear resistance and a high strength to break. It was furthermore observed that during its utilization in cold environments, said radome is less affected by low temperature induced damages, e.g. cracks and the like.

Preferably, the flexible radome wall comprises:

(i) a woven fabric comprising yarns containing polyethylene fibers, preferably UHMWPE fibers;

(ii) a plastomer layer having a first part adhered to one surface of said woven fabric and a second part impregnated between the yarns and/or the fibers of said fabric, the second part extending throughout said fabric and being cohesively connected to said first part; and wherein said plastomer is a semi-crystalline copolymer of ethylene or propylene and one or more C2 to C12 α-olefin co-monomers and wherein said plastomer has a density as measured according to ISO1183 of between 860 and 930 $kg/m^3$.

It was further noticed that yet a better shrinkage resistance for the inflatable radome of the invention may be obtained when the plastomer layer adheres to both surfaces of the woven fabric, therefore encapsulating said fabric. Therefore, in a preferred embodiment, the flexible radome wall comprises:

(i) a woven fabric having an upper surface and a lower surface and comprising yarns containing polyethylene fibers, preferably UHMWPE fibers;

(ii) a plastomer layer encapsulating said fabric, said plastomer layer having a first part adhered to said upper surface; a third part adhered to said lower surface; and a second part which is impregnated between the yarns and/or the fibers of said fabric and extends throughout said fabric, said second part being cohesively connected to said first and third part of said plastomer layer; wherein said plastomer is a semi-crystalline copolymer of ethylene or propylene and one or more C2 to C12 α-olefin co-monomers and wherein said plastomer has a density as measured according to ISO1183 of between 860 and 930 $kg/m^3$.

Preferably said second part is impregnated between both the yarns and the fibers. The second part of the plastomer layer also extends throughout said fabric meaning that the plastomer is distributed along the lateral dimensions of the fabric as well as along the vertical dimension of the fabric between the surfaces thereof. Preferably, the impregnation is carried out such that said second part of the plastomer layer extends along the vertical dimension from one surface of the fabric all the way to the opposite surface thereof.

By a plastomer layer adhered to a surface of a fabric is herein understood that the plastomer grips by physical forces to the fibers of the fabric with which it comes into contact. It is however not essential for the invention that the plastomer actually chemically bonds to the surface of the fibers. It was observed that the plastomer used according to the invention has an increased grip on e.g. the polyethylene fibers as compared with other types of thermoplastic materials. In a preferred embodiment the surface of the polyethylene fibers is corrugated, have protrusions or hollows or other irregular surface configurations in order to improve the grip between the plastomer and the fiber.

By two cohesively connected parts of the plastomer layer is herein understood that said parts are fused together into a single body such that preferably no line of demarcation is formed therein between and preferably no substantial variations of mechanical or other physical properties occur throughout the plastomer layer.

It also goes without saying that the terms "upper surface" and "lower surface" are merely used to identify the two surfaces which are characteristic to a woven fabric and should not be interpreted as actually limiting the woven fabric to facing a certain up or down positioning.

Preferred woven fabrics for use according to the invention are fabrics having a cover factor of at least 1.5, more preferably at least 2, most preferably at least 3. Preferably, said cover factor is at most 30, more preferably at most 20, most preferably at most 10. It was observed that the use of such fabrics lead to an optimum impregnation of the woven fabric minimizing the amount of voids or air pockets contained by e.g. the flexible radome wall. It was furthermore observed that a more homogeneous flexible radome wall is obtained which in turn imparted the inflatable radome of the invention with less local variations of its mechanical properties and better shape stability. The impregnation with a plastomer can be carried out for example by forcing under pressure the molten plastomer through said fiber and/or yarns.

The plastomer used in accordance with the invention is a plastic material that belongs to the class of thermoplastic materials. According to the invention, said plastomer is a semi-crystalline copolymer of ethylene or propylene and one or more C2 to C12 α-olefin co-monomers, said plastomer having a density of between 860 and 930 kg/$m^3$. It was observed that a flexible support containing the plastomer showed a good shrinkage resistance when the plastomer was manufactured by a single site catalyst polymerization process, preferably said plastomer being a metallocene plastomer, i.e. a plastomer manufactured by a metallocene single site catalyst. Ethylene is in particular the preferred co-monomer in copolymers of propylene while butene, hexene and octene are being among the preferred α-olefin co-monomers for both ethylene and propylene copolymers.

In a preferred embodiment, said plastomer is a thermoplastic copolymer of ethylene or propylene and containing as co-monomers one or more α-olefins having 2-12 C-atoms, in particular ethylene, isobutene, 1-butene, 1-hexene, 4-methyl-1-pentene and 1-octene. When ethylene with one or more C3-C12 α-olefin monomers as co-monomers is applied, the amount of co-monomer in the copolymer usually is lying between 1 en 50 wt. %, and preferably between 5 and 35 wt. %. In case of ethylene copolymers, the preferred co-monomer is 1-octene, said co-monomer being in an amount of between 5 wt % and 25 wt %, more preferably between 15 wt % and 20 wt %. In case of propylene copolymers, the amount of co-monomers and in particular of ethylene co-monomers, usually is lying between 1 en 50 wt. %, and preferably between 2 and 35 wt %, more preferably between 5 and 20 wt. %. Good results in terms of shrinkage may be obtained when the density of the plastomer is between 880 and 920 kg/$m^3$, more preferably between 880 and 910 kg/$m^3$.

Better resistance to shrinkage may be obtained when the plastomer used according to the invention has a DSC peak melting point as measured according to ASTM D3418 of between 70° C. and 120° C., preferably between 70° C. and 100° C., more preferably between 70° C. and 95° C.

A plastomer manufactured by a single site catalyst polymerization process and in particular a metallocene plastomer is distinguished from ethylene and propylene copolymers that have been manufactured with other polymerization techniques, e.g. Ziegler-Natta catalysation, by its specific density. Said plastomer also differentiates itself by a narrow molecular weight distribution, Mw/Mn, the values thereof preferably being between 1.5 en 3 and by a limited amount of long chain branching. The number of long chain branches preferably amounts at most 3 per 1000 C-atoms. Suitable plastomers that may be used in the flexible radome wall utilized in accordance with the invention and obtained with the metallocene catalyst type are manufactured on a commercial scale, e.g by DEXPlastomers, ExxonMobil, Mitsui and DOW under brand names as Exact, Exceed, Vistamaxx, Tafmer, Engage, Affinity and Versify, respectively. A description of plastomers and in particular of metallocene plastomers as well as an overview of their mechanical and physical properties can be found for instance in Chapter 7.2 of "Handbook of polypropylene and polypropylene composites" edited by Harutun G. Karian (ISBN 0-8247-4064-5) and more in particular in subchapters 7.2.1; 7.2.2; and 7.2.5 to 7.2.7 thereof, which are included herein by reference.

It is also possible to use compositions comprising the plastomer used in accordance with the invention and other thermoplastic materials and/or even other plastomer grades. In a preferred embodiment, a blend containing the plastomer and a functionalized polyolefin are used in accordance with the invention. Preferably the functionalized polyolefin is in an amount of between 1 wt % and 99 wt % of the blend weight, more preferably between 2.5 wt % and 50 wt %, more preferably between 5 wt % and 25 wt %. The functionalized polyolefin is preferably functionalized with a bifunctional monomer, the amount of the bifunctional monomer being between 0.1 wt % and 10 wt %, more preferably between 0.35 wt % and 5 wt %, most preferably between 0.7 wt % and 1.5 wt % of the weight of the polyolefin. Preferably the polyolefin used for functionalisations is also a plastomer, more preferably said polyolefin is the plastomer used in accordance with the invention. Preferably the polyolefin is functionalized with a bifunctional monomer such as maleicanhydride (MA) or vinyltrimethoxysilane (VTMOS). MA and VTMOS functionalized polyolefin's are commercially available products and the functionalization of the polyolefin may be carried out in accordance with known methods in the art, e.g. in an extrusion process, using peroxide as initiator. The advantage of using a functionalized polyolefin, preferably a functionalized plastomer is that the mechanical stability of the flexible radome wall used in accordance with the invention may be improved.

Good shrinkage resistance may be obtained when the flexible radome wall used in accordance with the invention contains a fabric, preferably a woven fabric, and wherein the amount of plastomer was chosen to yield a flexible radome wall having an areal density (AD) that is with at least 20%, more preferably at least 50% higher than the AD of the fabric utilized therein. Preferably the flexible radome wall has an areal density (AD) that is with at most 500%, more preferably at most 400%, most preferably at most 300% higher than the AD of the fabric, preferably of the woven fabric, utilized therein. Good results may be obtained when the plastomer encapsulates the fabric which is preferably a woven fabric and the amount of plastomer was chosen as indicated hereinabove. AD is expressed in kg/$m^2$ and is obtained by weighing a certain area, e.g. 0.01 $m^2$ and dividing the obtained mass by the area of the sample.

The plastomer used in accordance with the invention may also contain various fillers and/or additives as defined hereinafter. In a preferred embodiment, the flexible radome wall comprises a woven fabric, a plastomer layer as defined hereinabove and optionally various fillers and/or additives as defined hereinafter added to the plastomer. Preferably, however, the plastomer is free of any filler and/or additive. It was observed that when the inflatable radome of the invention comprises a flexible radome wall in accordance with this embodiment, said radome may show a reduced shrinkage while being strong and lightweight. Moreover, said radome wall may easily be sealed along a seam by heat welding, which provides a strong seal and results in overall time and cost savings.

Examples of fillers include reinforcing and non-reinforcing materials, e.g. carbon black, calcium carbonate, clay, silica, mica, talcum, and glass. Examples of additives include stabilizers, e.g. UV stabilizers, pigments, antioxidants, flame retardants and the like. Preferred flame retardants include aluminum tryhidrate, magnesium dehydrate, ammonium polyphosphate and others. The amount of flame retardants is preferably from 1 to 60, more preferably from 5 to 30 by weight percent of the amount of thermoplastic material contained by the flexible support. Most preferred flame retardant is ammonium phosphate, e.g. supplied by Budenheim (Budit) and Clariant (Exolit)

A flexible radome wall can be manufactured according to known methods in the art. Examples of such methods are disclosed in U.S. Pat. No. 5,773,373 and U.S. Pat. No. 6,054,178 included herein by reference. Preferably, the flexible radome wall is manufactured by a lamination method as for example the one disclosed in U.S. Pat. No. 4,679,519 included herein by reference, said method being routinely adapted to the materials used in the present invention.

Preferably, the thickness of the flexible radome wall is between 0.2 mm and 10 mm, more preferably between 0.3 mm and 5 mm. In case said flexible radome wall contains a fabric, its thickness is dependent upon the nature of the fabric and the thickness and the quantity of the plastomer. The AD of said flexible radome wall is preferably between 0.2 kg/m$^2$ and 3 kg/m$^2$, more preferably between 0.2 kg/m$^2$ and 2 kg/m$^2$.

When the flexible radome wall comprises a fabric and in particular a woven fabric which is encapsulated by the plastomer, said fabric can be positioned in the center of said flexible radome wall or off center. Good results in terms of shrinkage may be obtained when the fabric was positioned as close as possible to the center of the flexible radome wall.

Preferably, the flexible radome wall has a total shrinkage, i.e. the average shrinkage in the warp and the weft directions of the woven fabric, of less than 1.5%, more preferably of less than 1.2%, even more preferably of less than 1.0%, yet even more preferably of less than 0.8%, yet even more preferably of less than 0.6%, most preferably of less than 0.45% when measured according to the methodology disclosed hereinafter in the "METHODS OF MEASUREMENT" section of the present document. Preferably, the flexible radome wall has a shrinkage in the warp direction of less than 1%, more preferably less than 0.6%. Preferably, the flexible radome wall has a shrinkage in the weft direction of less than 1%, more preferably less than 0.5%.

The inflatable radome of the invention can be constructed according to known methods in the art, e.g. those described in US 2004/0222938; U.S. Pat. No. 3,005,987 and U.S. Pat. No. 3,075,191, the disclosures of which being included herein by reference.

The present invention relates furthermore to an inflatable structure comprising the flexible wall used as the radome wall in accordance with the invention. Such a structure may be an antenna, in particular an antenna having a dish wherein at least said dish is inflatable; an inflatable greenhouse; an inflatable tent, and the like.

The invention also relates to a system comprising an antenna, preferably a portable antenna, and the inflatable radome of the invention. Preferably said antenna, in particular the dish of the antenna, is also inflatable.

The invention will be further explained with the help of the following examples without being however limited thereto.

Methods of Measurement

IV: the Intrinsic Viscosity of UHMWPE is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration.

Cover factor: of a woven fabric is calculated by multiplying the average number of individual weaving yarns per centimeter in the warp and the weft direction with the square root of the linear density of the individual weaving yarns (in tex) and dividing by 10.

An individual weaving yarn may contain a single yarn as produced, or it may contain a plurality of yarns as produced said yarns being assembled into the individual weaving yarn prior to the weaving process. In the latter case, the linear density of the individual weaving yarn is the sum of the linear densities of the as produced yarns. The cover factor (CF) can be thus computed according to formula:

$$CF = \frac{m}{10}\sqrt{pt} = \frac{m}{10}\sqrt{T}$$

wherein m is the average number of individual weaving yarns per centimeter, p is the number of as produced yarns assembled into a weaving yarn, t is the linear density of the yarn as produced (in tex) and T is the linear density of the individual weaving yarn (in tex).

Dtex: of a fiber was measured by weighing 100 meters of fiber. The dtex of the fiber was calculated by dividing the weight in milligrams by 10.

Shrinkage: a square sample of 0.4 m length and 0.4 m width, was placed in the drum of a laundry machine and rotated in the absence of water at a rotating speed of 60 rot/min for 72 hours at a temperature of about 23° C. and humidity of about 65% together with a number of 5 clay balls. Each clay ball had a mass of 0.22 Kg and a diameter of about 50 mm, the surface of each ball being covered with a cotton fabric by placing the ball in a cotton bag which tightly accommodates the ball. The dimensions of the sample were measured before and after the treatment and the difference thereof (expressed in %) was considered representative for the shrinkage of the sample.

Tensile properties, i.e. strength and modulus, of polymeric fibers were determined on multifilament yarns as specified in ASTM D885M, using a nominal gauge length of the fibre of 500 mm, a crosshead speed of 50%/min and Instron 2714 clamps, of type Fibre Grip D5618C. For calculation of the strength, the tensile forces measured are divided by the titre, as determined by weighing 10 meters of fibre; values in GPa for are calculated assuming the natural density of the polymer, e.g. for UHMWPE is 0.97 g/cm$^3$.

The tensile properties of polymeric tapes: tensile strength and tensile modulus are defined and determined at 25° C. on tapes of a width of 2 mm as specified in ASTM D882, using a nominal gauge length of the tape of 440 mm, a crosshead speed of 50 mm/min.

The tensile strength and modulus of inorganic fibers and in particular of glass fibers was measured according to ASTM D4018-81 at 22° C.

Tensile modulus of thermoplastic materials was measured according to ASTM D-638(84) at 25° C.

EXAMPLE AND COMPARATIVE EXPERIMENT

Example

A radome wall was manufactured from a basket woven fabric having an AD of 0.193 kg/m$^2$, a thickness of about 0.6 mm and a width of about 1.72 m, and containing 880 dtex polyethylene yarns known as Dyneema® SK 65 which was impregnated with Exact® 0203. Exact® 0203 is plastomer from DEXPlastomers and is an ethylene based octane plastomer with about 18% octane, a density of 902 kg/m$^3$ and a DSC peak melting point of 95° C.

The plastomer was molten at a temperature of about 145° C. and discharged on a surface of the fabric.

A pressure of about 45 bars was applied to impregnate the plastomer into the fabric at a temperature of about 120° C.

The above process was repeated in order to coat both surfaces of the woven fabric. The obtained flexible radome wall had a thickness of about 0.8 mm, an AD of 0.550 kg/m$^2$ and less than 40% voids. The AD of the wall was 280% larger than the AD of the woven fabric. The plastomer layer was devised into:

a first part of AD of about 0.175 kg/m$^2$ covering one surface;

a second part impregnated through the fabric between the yarns and fibers thereof; and a third part having an AD of about 0.175 kg/m$^2$ covering the other surface.

The results are presented in Table 1.

Comparative Experiment

A flexible radome wall was manufactured from the fabric used in EXAMPLE 1. The results are presented in Table 1.

| Sample | Shrinkage in warp direction (%) | Shrinkage in weft direction (%) | Total shrinkage (%) |
|---|---|---|---|
| Example 1 | 0.96 | 0.42 | 0.69 |
| Uncoated fabric of polyethylene (COMPARATIVE EXPERIMENT) | 21.00 | 34.00 | 27.5 |

From the above examples it can be observed that the flexible radome wall used in accordance with the invention shows a reduced shrinkage when compared to a radome wall manufactured from known UHMWPE fabrics.

The invention claimed is:

1. An inflatable radome which is sized and configured to be inflated and deflated repeatedly to cover an electromagnetic antenna, wherein the inflatable radome includes a flexible radome wall, wherein the radome wall includes a fabric comprised of high strength gel spun ultrahigh molecular weight polyethylene (UHMWPE) fibers and a plastomer, wherein the plastomer is a semi-crystalline copolymer of ethylene or propylene and one or more C2 to C12 α-olefin co-monomers, and wherein the plastomer has a density as measured according to ISO1183 of between 860 and 930 kg/m$^3$, and wherein the radome wall exhibits reduced electromagnetic radiation losses over a frequency bandwidth range of from 1 GHz to at least 100 GHz and is sufficiently flexible such that an unsupported free end of the radome wall which is separated by 500 mm opposite to a supported end of the radome wall will deflect under its own weight at an angle of more than 10°, and wherein the radome wall retains shape after repeated inflation and deflation cycles.

2. The inflatable radome of claim 1, wherein the UHMWPE fibers have a cross-sectional aspect ratio of width to thickness of at least 5:1.

3. The inflatable radome of claim 1, wherein the UHMWPE fibers have a tensile strength of at least 0.5 GPa.

4. The inflatable radome of claim 1, wherein the UHMWPE fibers have a tensile modulus of at least 30 GPa.

5. The inflatable radome of claim 1, wherein the fabric is selected from the group consisting of woven fabrics, knitted fabrics, plaited fabrics, braided fabrics, non-woven fabrics and combinations thereof.

6. The inflatable radome of claim 1, wherein the fabric is a woven fabric selected from the group consisting of a plain weave fabric and a basket weave fabric.

7. The inflatable radome of claim 1, wherein the plastomer is impregnated throughout the fabric.

8. The inflatable radome of claim 1, wherein the plastomer has a tensile modulus of at most 0.6 GPa.

9. The inflatable radome of claim 1, wherein the fabric is a woven fabric having a cover factor of at least 1.5, wherein the cover factor (CF) is determined by the formula:

$$CF = \frac{m}{10}\sqrt{pt} = \frac{m}{10}\sqrt{T}$$

wherein m is the average number of individual weaving yarns per centimeter, p is the number of as produced yarns assembled into a weaving yarn, t is the linear density of the yarn as produced (in tex) and T is the linear density of the individual weaving yarn (in tex).

10. The inflatable radome of claim 1, wherein the plastomer has a tensile modulus of at least 0.01 GPa.

11. The inflatable radome of claim 1, wherein the plastomer is present in an amount effective to yield a flexible radome wall having an areal density (AD) that is at least 20% higher than the AD of the fabric.

12. The inflatable radome of claim 1, wherein the flexible radome wall has a thickness of between 0.2 mm and 10 mm.

13. The inflatable radome of claim 1, wherein the plastomer is a thermoplastic copolymer of ethylene or propylene containing at least one co-monomer selected from the group consisting of ethylene, isobutene, 1-butene, 1-hexene, 4-methyl-1-pentene and 1-octene.

14. The inflatable radome of claim 11, wherein the fabric is a woven fabric, and wherein the plastomer is present in an amount effective to yield a flexible radome wall having an areal density (AD) that is at least 50% higher than the AD of the woven fabric.

* * * * *